(12) United States Patent
Travis

(10) Patent No.: US 7,849,245 B2
(45) Date of Patent: Dec. 7, 2010

(54) BUS-BASED COMMUNICATION SYSTEM

(75) Inventor: Christopher Julian Travis, Wotton-under-Edge (GB)

(73) Assignee: Wolfson Microelectronics plc, Edinburgh (GB)

( * ) Notice: Subject to any disclaimer, the term of this patent is extended or adjusted under 35 U.S.C. 154(b) by 178 days.

(21) Appl. No.: 11/798,903

(22) Filed: May 17, 2007

(65) Prior Publication Data

US 2008/0209094 A1 Aug. 28, 2008

(30) Foreign Application Priority Data

Feb. 28, 2007 (GB) ................... 0703914.2

(51) Int. Cl.
G06F 13/00 (2006.01)
G06F 13/368 (2006.01)
G06F 13/36 (2006.01)

(52) U.S. Cl. .................. 710/119; 710/107; 710/309

(58) Field of Classification Search ............. 710/119, 710/107, 309
See application file for complete search history.

(56) References Cited

U.S. PATENT DOCUMENTS 5,469,473 A * 11/1995 McClear et al. ............. 375/219
2006/0171310 A1* 8/2006 Ahluwalia et al. .......... 370/229

FOREIGN PATENT DOCUMENTS

WO    WO 00/00902    6/2000

OTHER PUBLICATIONS

IBM Technical Disclosure Bulletin, vol. 31, No. 12, May 1989, "Delay Compensation for CMSA/DC Bit Arbitration Data Bus Access Control."
"Transmission Code for CSMA/CD", IBM Technical Disclosure Bulletin, Jan. 1989.
"CSMA/CD Baseband Network Collision Detection", IBM Technical Disclosure Bulletin, vol. 32, No. 5A, Oct. 1, 1989, pp. 326-330, XP000048934.

* cited by examiner

Primary Examiner—Mark Rinehart
Assistant Examiner—Jeremy S Cerullo
(74) Attorney, Agent, or Firm—Dickstein Shapiro LLP

(57) ABSTRACT

A communications bus operates using transition coding, for example NRZI coding, with transition-dominant signalling. That is, when the signal takes a first binary value, binary "1", the component drives the bus line to its opposite state, and, when the signal takes a second binary value, binary "0", the component does not actively drive the bus line. During arbitration, each arbitrating component writes a unique arbitrand onto the bus, and arbitration is lost by each component that writes a binary "0" when at least one other component writes a binary "1". The components preferably do not use transition-dominant signalling when transmitting data payloads. For such traffic they actively drive the binary "0"s as well as binary "1"s.

22 Claims, 3 Drawing Sheets

BUS-BASED COMMUNICATION SYSTEM

BACKGROUND OF THE INVENTION

1. Field of the Invention

This invention relates to a bus-based communication system, and in particular to a system for arbitrating between components connected to the bus, and for signalling over the bus.

2. Description of the Related Art

Multidrop serial buses are known for their low infrastructure costs and straightforward setup. Examples include the I²C™ bus and the CAN bus. The flexibility of these buses comes largely from the fact that any of the connected components, which may for example be separate integrated circuits, may arbitrate for access. Distributed arbitration is used because centralized or daisy-chained arbitration would have raised the infrastructure costs. Though the main purpose of the data line of the bus is to carry data payloads, it also supports the arbitration process.

In these prior art buses, the data line has a dominant state and a recessive state. For example, I²C uses the well known wired-OR arrangement with open collector drivers and a pull up resistor. The line goes high (recessive) only when none of the components is driving it low (dominant). The arbitration process actually relies on this dominant-recessive behaviour. It uses a protocol called "bit dominance" or "binary countdown", which works as follows. Each arbitrating component starts writing a unique access code, i.e. number, to the line, one bit at a time. At each stage the component also reads back the state of the line. If it wrote the recessive state but it reads back the dominant state, the component loses arbitration and drops out. At the end of the process, the one component that has not dropped out wins access to the bus.

The drive impedance of the recessive state is generally at least an order of magnitude higher than that of the dominant state. Hence such buses tend to have relatively high susceptibility to interference. Similarly, the transitions to the recessive state generally take at least an order of magnitude longer than those to the dominant state. Hence such buses tend to have a relatively low maximum bit rate. Power dissipation can also be a problem. On wired-OR communications buses, the pull-up resistor dissipates power even while the dominant-recessive behaviour is not required, e.g. while data payloads are being carried.

Systems that instead have low-high symmetry in their electrical layer are unencumbered by the weaknesses of a recessive state. They tend to be more robust, faster and less power-hungry. Hence buses that don't need dominant-recessive behaviour generally have broadly symmetric electrical layers. This includes basic time-division-multiplex serial buses, for example, although such buses typically do not support arbitration.

SUMMARY OF THE INVENTION

According to a first aspect of the present invention, there is provided bus-based communication system, comprising a bus line, and a plurality of components connected to the bus line, wherein, when arbitrating for access to the bus:

each component writes an arbitrand to the bus line using transition coding, such that, when the arbitrand takes a first binary value, the component drives the bus line to its opposite state, and, when the arbitrand takes a second binary value, the component does not actively drive the bus line.

This has the advantage that, in embodiments of the invention, there is provided a communications bus having a distributed arbitration scheme without relying on the electrical layer of the bus having a dominant state and a recessive state. Thus, embodiments of the invention provide a flexible multidrop bus that is robust, while being acceptably fast and having acceptable power consumption.

Further aspects of the present invention give additional improvements in the robustness of the bus while it is carrying data payloads and while it is idle.

BRIEF DESCRIPTION OF THE DRAWINGS

For a better understanding of the present invention, and to show how it may be put into effect, reference will now be made, by way of example, to the accompanying drawings, in which.

DETAILED DESCRIPTION OF THE PREFERRED EMBODIMENT

Figure 1:
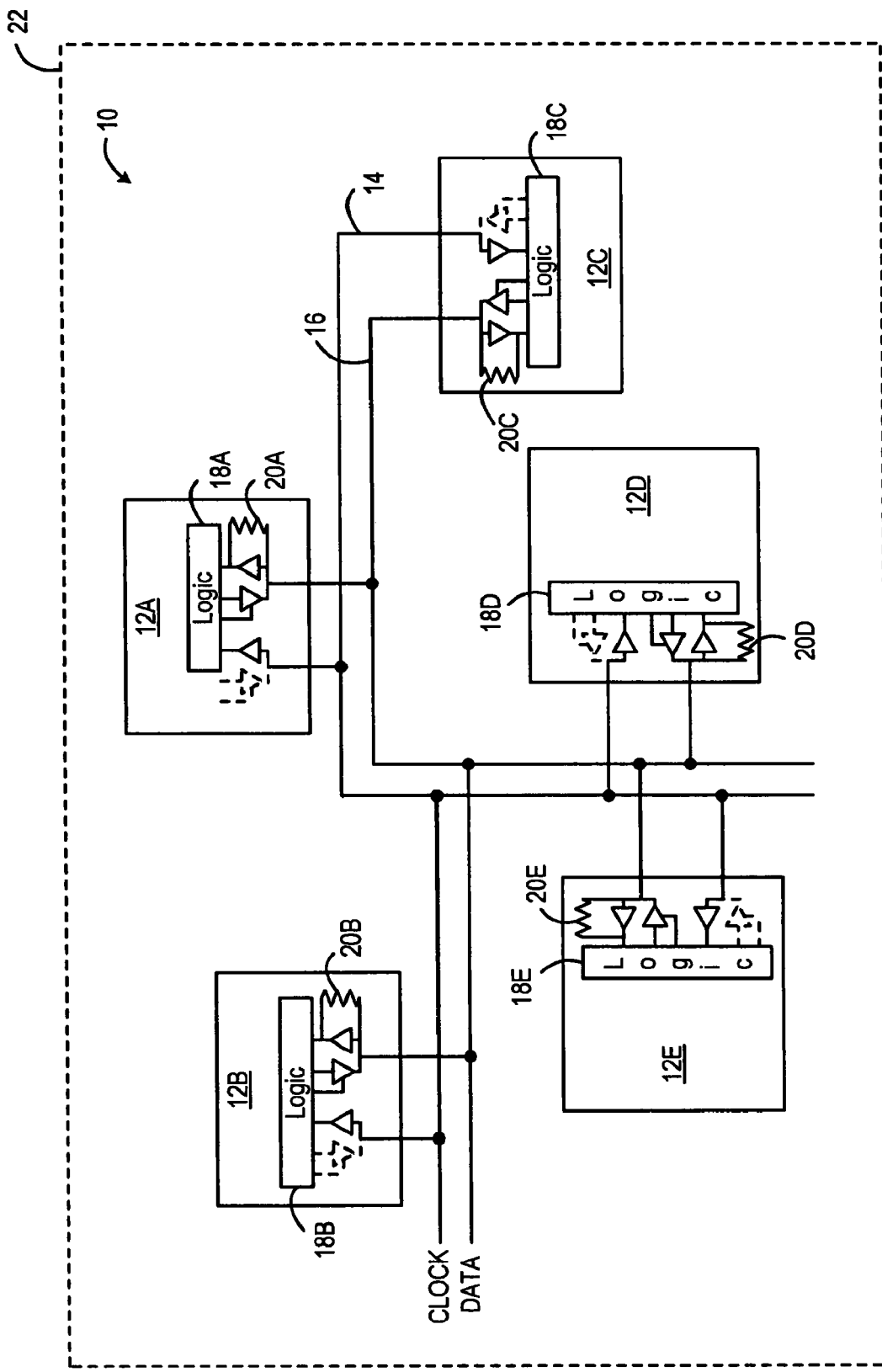
FIG. 1 is a block schematic diagram, illustrating a communications bus in accordance with an aspect of the invention.

FIG. 1 illustrates a bus-based communication system 10 in accordance with the present invention. As shown in FIG. 1, the system 10 includes various components 12A, 12B, 12C, 12D and 12E, interconnected by a two-wire bus, with one line 14 carrying the bus clock and the other line 16 carrying the bus data.

As will be recognized, the communications bus will define methods by which each component must write data to, and read data from, the data line of the bus. However, such details are not essential to an understanding of the present invention, and will not be described further herein. In general terms, each of the components 12A, 12B, 12C, 12D and 12E contains appropriate logic 18A, 18B, 18C, 18D and 18E, of a type which will be well known and understood by the person skilled in the art, suitable for generating and detecting the signals described herein.

As an example, each of the components 12A, 12B, 12C, 12D and 12E may take the form of a separate integrated circuit in an electronic apparatus 22. For example, the electronic apparatus may be a mobile communications device such as a mobile phone or PDA, with audio and video processing functionality, and the various components may include speech coders, video processing ICs, audio processing ICs, etc.

In accordance with the present invention, at any one time, one of the components 12A, 12B, 12C, 12D and 12E is designated as the active framer, and hence as the source of the clock signal on the clock line 14. The communications bus 10 is preferably a synchronous system, in which any component is able to write data out while the clock is HIGH, and to read data in on the falling edge of the clock.

The invention is thus described herein, in the context of a particular family of synchronous two wire multidrop communications buses with single-ended signalling. Despite the specifics of the description, numerous variations, modifications and other applications will be apparent to those skilled in the art. For example, the invention is also applicable to buses that do not have a dedicated clock line, to buses that have multiple data lines, and to buses with differential signalling.

Figure 2:
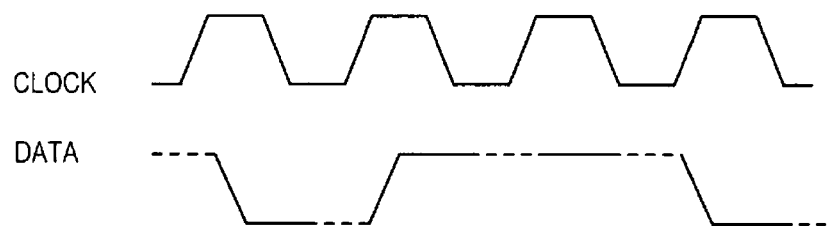
FIG. 2 illustrates signals in the communications bus of FIG. 1.

FIG. 2 shows abstracted clock and data waveforms for a period of time in which a component is writing part of a data payload to the bus. Thus, as shown in FIG. 2, the clock signal has alternating periods when it is HIGH and LOW, and the data is written onto the data line 16 only while the clock line 14 is HIGH.

The data line 16 carries different rates of data traffic at different times, and there will be some periods in which it does not carry any data traffic. To stop the data line 16 from floating to undefined logic levels during these periods, bus hold circuitry is provided.

As shown in FIG. 1, each of the components 12A, 12B, 12C, 12D and 12E includes a respective bus holder, represented by the resistor 20A, 20B, 20C, 20D and 20E. This therefore is a distributed "bus hold" solution. Other types of solution are also possible, including "centralized", "hybrid" and "software-configured" solutions.

As discussed above, one of the key issues for a communications bus, in particular where many connected components are able to transmit data over the bus, is to determine which of those components should have priority, when multiple components attempt to transmit. This is determined by a system referred to as arbitration.

In accordance with an embodiment of the present invention, each component arbitrates for access using a unique binary number, i.e. code, referred to as an arbitrand.

Figure 3:
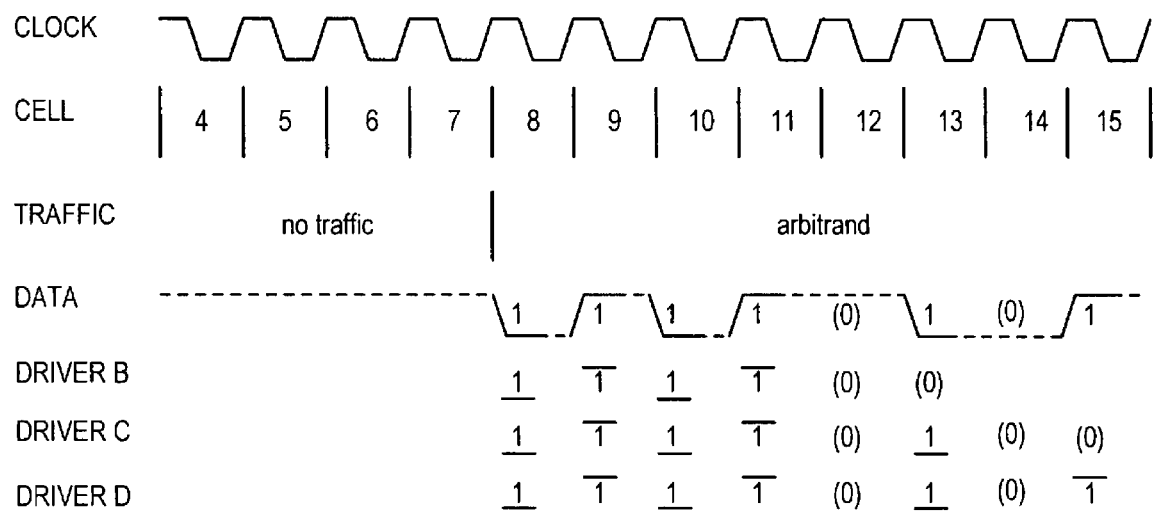
FIG. 3 illustrates signals in the communications bus of FIG. 1 during an arbitration process.

FIG. 3 shows example waveforms and driver states for a period of time in which the bus traffic changes from none to arbitrand, i.e. during which multiple components wish to start transmitting data. The data waveform is drawn as a solid trace for the intervals in which the line is being actively driven, and as a dashed trace where the line is being maintained by capacitance and the bus hold circuitry. The driver states are shown as sections of solid trace, only for the intervals of active drive.

As shown in FIG. 3, in this illustrative case, the bus is idle for an initial period through cells 4 to 7. At cell 8, components B, C and D all start arbitrating for access.

The arbitration scheme uses transition coding and in this particular example NRZI transition coding. As is well known, with NRZI coding a 'one' is represented by a change of state (LOW-to-HIGH or HIGH-to-LOW), and a 'zero' is represented by no change of state. During arbitration, components NRZI-encode the bits that they write to the data line 16, and they NRZI-decode the bits that they read back from the data line 16. The arbitration scheme also uses a transition-dominant signalling rule. During arbitration, components write NRZI 'ones' by driving the data line 16 (to its opposite state), but with NRZI 'zeros' they do not actively drive the line. (In the present context, the operation of the bus holder does not count as active drive.) A consequence of this signalling rule is that, during arbitration, NRZI 'ones' win out over NRZI 'zeros'.

Arbitration proceeds in one-bit steps. At each step, every arbitrating component writes one bit of its arbitrand to the data line, starting with the most-significant bit, and also reads back from the line.

In general, components that write an NRZI 'zero' but read back an NRZI 'one' lose arbitration and stop arbitrating. This reflects the fact that, if an NRZI 'one' is read back, at least one of the other arbitrating components must have a higher arbitrand. The net result is that the component with the highest arbitrand wins the arbitration.

Thus, considering in detail the situation illustrated in FIG. 3, the arbitrand of component B starts with 111100XX (i.e. the values of the seventh and eighth most significant bits turn out to be irrelevant), the arbitrand of component C starts with 11110100, and the arbitrand of component D starts with 11110101.

In cell 8, component B writes the most-significant bit of its arbitrand to the data line. This bit is a 'one', so component B actively drives the line to the opposite of its previous state. Similarly, components C and D also write 'ones'. Also, each of the components reads the value on the data line. However, as these components have each written 'ones', they each continue to arbitrate. The same thing happens in cells 9, 10 and 11.

The most-significant bits of component B's arbitrand are 111100, so in cell 12 component B writes a 'zero' to the data line. During arbitration, the signalling rule is transition-dominant, and so component B actually tri-states its data driver. In this example components C and D also have zeroes as the fifth most significant bits of their arbitrands, and so they each write a 'zero' to the data line, and so the data line carries a 'zero' and all three components continue to arbitrate.

In cell 13, component B, which also has a zero as the sixth most significant bit of its arbitrand, again writes a 'zero' by tri-stating, but components C and D both have ones as the sixth most significant bits of their arbitrands, and so they each write 'ones' to the data line. Consequently, the data line carries a 'one' and component B drops out of the process.

In cell 14, as components C and D both have zeroes as the seventh most significant bits of their arbitrands, they each write a 'zero' to the data line, and so the data line carries a 'zero' and both components continue to arbitrate.

In cell 15 component C, which has a zero as the eighth most significant bit of its arbitrand, writes a 'zero' by tri-stating, but component D has a one as the eighth most significant bit of its arbitrand, and so it writes a 'one' to the data line. Consequently, the data line carries a 'one' and component C's 'zero' loses arbitration to component D's 'one'. Thus, component D will win the arbitration, and will be able to transmit data thereafter.

Although FIG. 3 shows the arbitration steps occurring in consecutive cells, this is not a requirement. The bus may be organized as time-division multiplex, with some of its time slots allocated to particular purposes either permanently or in a quasi-static way. In such cases, only a fraction of its total capacity will be available for dynamic allocation by arbitration. That fraction can be organized e.g. as a shared message channel that is interleaved with the other parts of the multiplex, as is the case for example in the proposed SLIMbus® system, proposed by MIPI Alliance, Inc. Within the message channel, arbitration can proceed as already described. The interleaving punctuates the process, but does not impede it.

Figure 4:
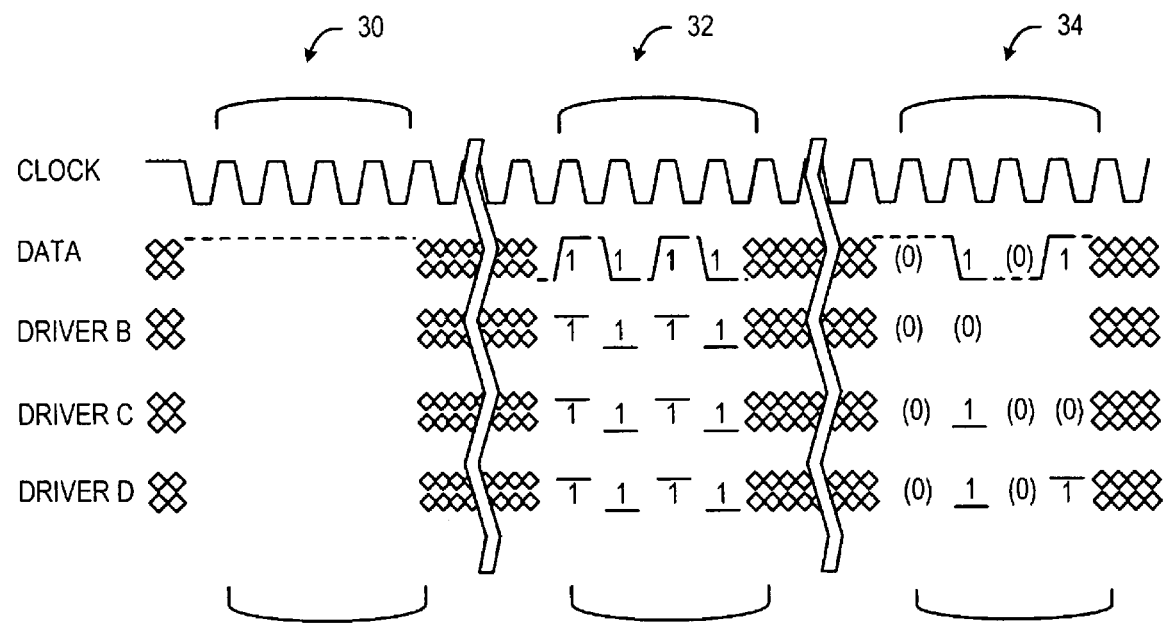
FIG. 4 illustrates signals in the communications bus of FIG. 1 during an alternative arbitration process.

This is illustrated in FIG. 4, which shows the traffic of FIG. 3 spread across three slices 30, 32, 34 of the message channel. In this case, it should be noted that the NRZI coding relates the present cell to the previous cell in the arbitration waveform, and not to the previous cell in the message channel.

In some embodiments of the invention, transition coding (and more specifically NRZI coding in particular embodiments) is used not just for particular traffic such as the arbitrands, but at all times, for example when transmitting payload data. In contrast, the transition-dominant signalling rule is preferably not used at all times, as doing so would give the bus a relatively high susceptibility to interference, because statistically only half of the carried bits would be actively driven. The preferred option with traffic such as data payloads is to actively drive every bit. Components can switch their signalling behaviour according to the bus traffic. In cells that will not be driven by more than one component, transition-dominant signalling is unnecessary and inappropriate.

There remains a concern about what happens in periods of no traffic. With the data line maintained only by the holder circuitry 20A, 20B, 20C, 20D, 20E, interference might appear as ghost data and disrupt the real communications, e.g. by causing components to lose message sync. One way of strengthening the signalling is to have one of the components repeatedly reiterate the logic level on the data line. The component reiterates the logic level by first capturing it (LOW or HIGH) and then driving it back onto the line. The times available for performing these actions are the periods in which the data line should be stable. The reiteration should be done by one component rather than many. In our exemplary bus we choose the same component as is transmitting the bus clock, i.e. the active framer component.

Figure 5:
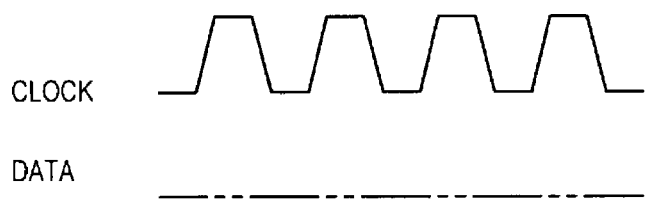
FIG. 5 illustrates further signals in the communications bus of FIG. 1.

FIG. 5 shows the active framer reiterating the data-line logic level during the second part of every cell, on an idle bus. As discussed above with respect to FIG. 2, this part of the waveform would not otherwise be actively driven. The benefit of such reiteration is greater interference rejection coming from the overall reduction of data-line impedance plus the interaction with bus capacitance.

Care is needed in implementing such logic-level reiteration, to avoid drive contention with other components at the cell boundaries. However, the timings are eased by the fact that the active framer has a time-advanced copy of the bus clock available internally.

Note that the bus hold circuitry loads the bus only during transitions. Its drive impedance can therefore be made significantly lower than that of a wired- or pull-up resistor, without incurring a power penalty. This increases robustness in undriven cells. Also, every data-line transition is actively driven. This allows high bit rates.

There is thus described a flexible, robust bus-based communication system that allows a high data rate with a relatively low power consumption.

What is claimed is:

1. A bus-based communication system, comprising
a bus line that can be in first or second opposite states, and
a plurality of components connected to the bus line, wherein, when arbitrating for access to the bus:
each component writes a respective arbitrand to the bus line using transition coding, such that, when an arbitrand takes a first binary value, the respective component writes the arbitrand to the bus line by driving the bus line to the state opposite to its current state, and, when the arbitrand takes a second binary value, the respective component writes the arbitrand to the bus line by not actively driving the bus line.

2. A bus-based communication system as claimed in claim 1, wherein the transition coding is NRZI coding.

3. A bus-based communication system as claimed in claim 1, wherein the arbitrand is unique to said component, and wherein arbitration is determined on the basis of the arbitrands of a plurality of arbitrating components, such that each component that transmits the second binary value during a time period when at least one other component transmits the first binary value loses the arbitration.

4. A bus-based communication system as claimed in claim 1, wherein the first binary value is a binary "1" and the second binary value is a binary "0".

5. A bus-based communication system as claimed in claim 4, wherein arbitration takes place during a plurality of time periods.

6. A bus-based communication system as claimed in claim 5, wherein arbitration takes place during a plurality of non-consecutive time periods.

7. A bus-based communication system as claimed in claim 1, wherein, when transmitting a payload data signal:
each component writes the payload data signal to the bus line using transition coding, such that, when the signal takes a first binary value, the component drives the bus line to its opposite state, and, when the signal takes a second binary value, the component drives the bus line to remain in its existing state.

8. A bus-based communication system as claimed in claim 7, wherein each component writes the payload data signal to the bus line using NRZI coding.

9. A bus-based communication system as claimed in claim 1, wherein one of said components detects a logic level on the bus line and repeatedly reiterates the detected logic level onto the bus line.

10. An electronic component, for connection to a communications bus including at least one bus line that can be in first or second opposite states, wherein, when arbitrating for access to the bus, said component is adapted to write an arbitrand to the bus line using transition coding, such that, when the arbitrand takes a first binary value, the component writes the arbitrand to the bus line by driving the bus line to the state opposite to its current state, and, when the arbitrand takes a second binary value, the component writes the arbitrand to the bus line by not actively driving the bus line.

11. An electronic component as claimed in claim 10, wherein said component is adapted to write the arbitrand to the bus line using NRZI coding.

12. An electronic component as claimed in claim 10, wherein, when transmitting a payload data signal:
the component is adapted to write the payload data signal to the bus line using transition coding, such that, when the signal takes a first binary value, the component drives the bus line to its opposite state, and, when the payload data signal takes a second binary value, the component drives the bus line to remain in its existing state.

13. An electronic component as claimed in claim 12, wherein the component is adapted to write the payload data signal to the bus line using NRZI coding.

14. An electronic component as claimed in claim 10, wherein the component is adapted to detect a logic level on the bus line and repeatedly reiterate the detected logic level onto the bus line.

15. An electronic component as claimed in claim 10, wherein the electronic component is an integrated circuit.

16. An electronic component as claimed in claim 15, wherein the electronic component is a data processing integrated circuit.

17. An electronic component as claimed in claim 15, wherein the electronic component is an audio processing integrated circuit.

18. An electronic component as claimed in claim 15, wherein the electronic component is a video processing integrated circuit.

19. An electronic apparatus, including at least one component as claimed in claim 10.

20. An electronic apparatus as claimed in claim 19, wherein said apparatus is a mobile communications device.

21. An electronic apparatus as claimed in claim 19, wherein said apparatus is a personal digital assistant (PDA) device.

22. A bus-based communication system, comprising
a bus line that can be in first or second opposite states; and a first plurality of components connected to the bus line, wherein, when a second plurality of said components each attempt to transmit over the bus, and are arbitrating for access to the bus:

each component of said second plurality of components writes a respective arbitrand to the bus line using transition coding, such that, when an arbitrand takes a first binary value, the respective component drives the bus line to the state opposite to its current state; and, when the arbitrand takes a second binary value, the respective component does not actively drive the bus line.

* * * * *